Dec. 8, 1942.  R. A. CARLSON ET AL  2,304,336
HYDRAULIC COUPLING
Filed March 6, 1940  2 Sheets-Sheet 1

Inventors:
Raymond A. Carlson and
Benjamin A. Swennes.
By Edward C. Gritzbaugh
Atty.

Dec. 8, 1942.                R. A. CARLSON ET AL            2,304,336
                              HYDRAULIC COUPLING
                            Filed March 6, 1940         2 Sheets-Sheet 2

Inventors:
Raymond A. Carlson and
Benjamin A. Swennes.
By: Edward C. Gritzbaugh
                Atty.

Patented Dec. 8, 1942

2,304,336

UNITED STATES PATENT OFFICE 2,304,336

HYDRAULIC COUPLING

Raymond A. Carlson and Benjamin A. Swennes, Rockford, Ill., assignors to Borg-Warner Corporation, Chicago, Ill., a corporation of Illinois Application March 6, 1940, Serial No. 322,440

5 Claims. (Cl. 60—54)

This invention relates to power transmitting devices of the hydrodynamic type and particularly to hydraulic couplings used for industrial purposes.

The object of this invention is to provide an improved hydrodynamic power transmitting device for internal combustion engines which are used for industrial or heavy duty work.

A feature of this invention is a pump construction wherein the pump vanes and the impeller element of the coupling are made from a single casting.

Another feature of this invention is a pumping arrangement wherein engine oil is used as the driving medium in the coupling.

Still another feature of this invention is an improved coupling wherein the impeller member is adjacent the main bearing of the engine and the driven member is welded directly upon the driven shaft to eliminate the necessity for using oil seals at the driven end of the coupling.

Figure 1:
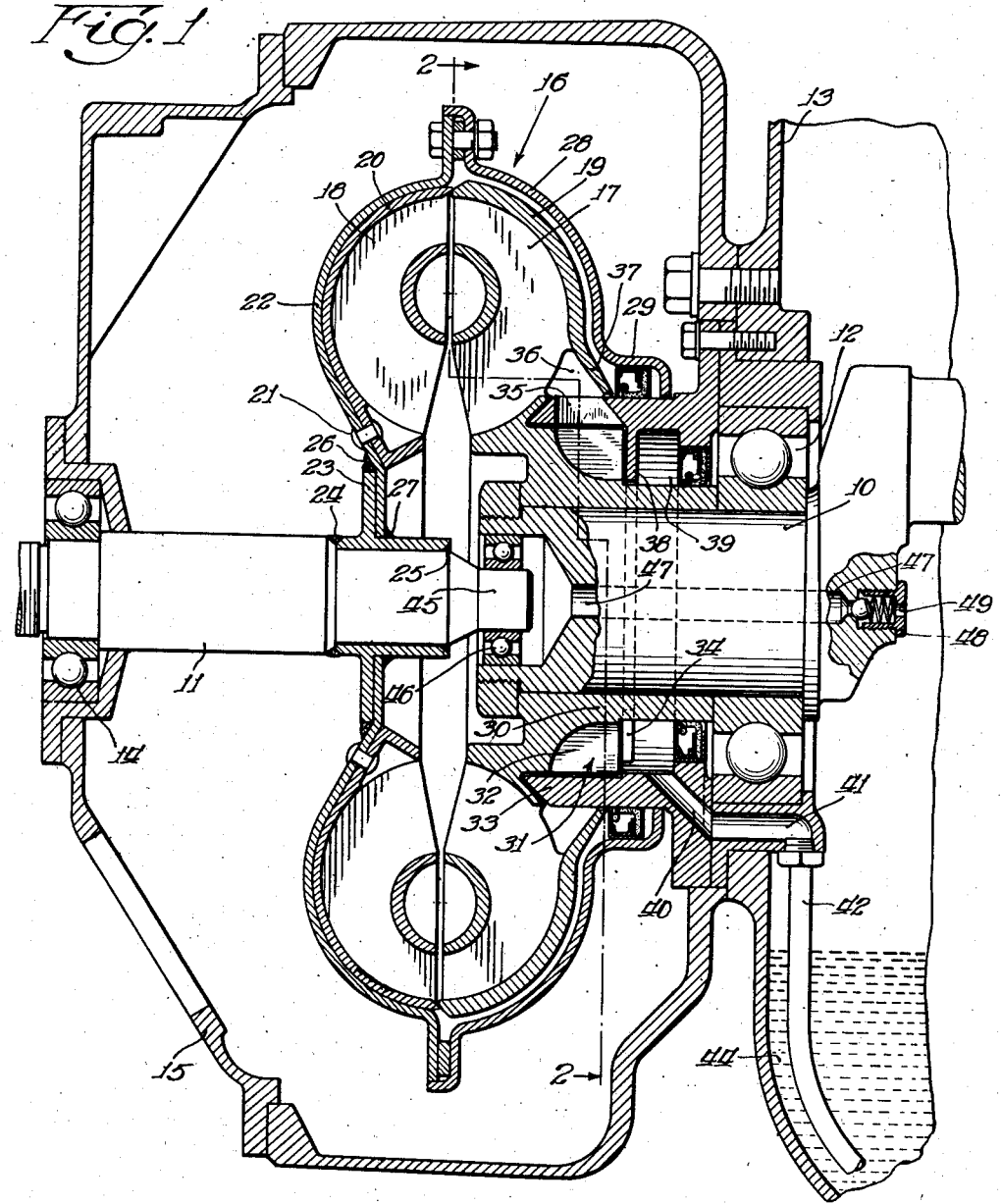
Figure 2:
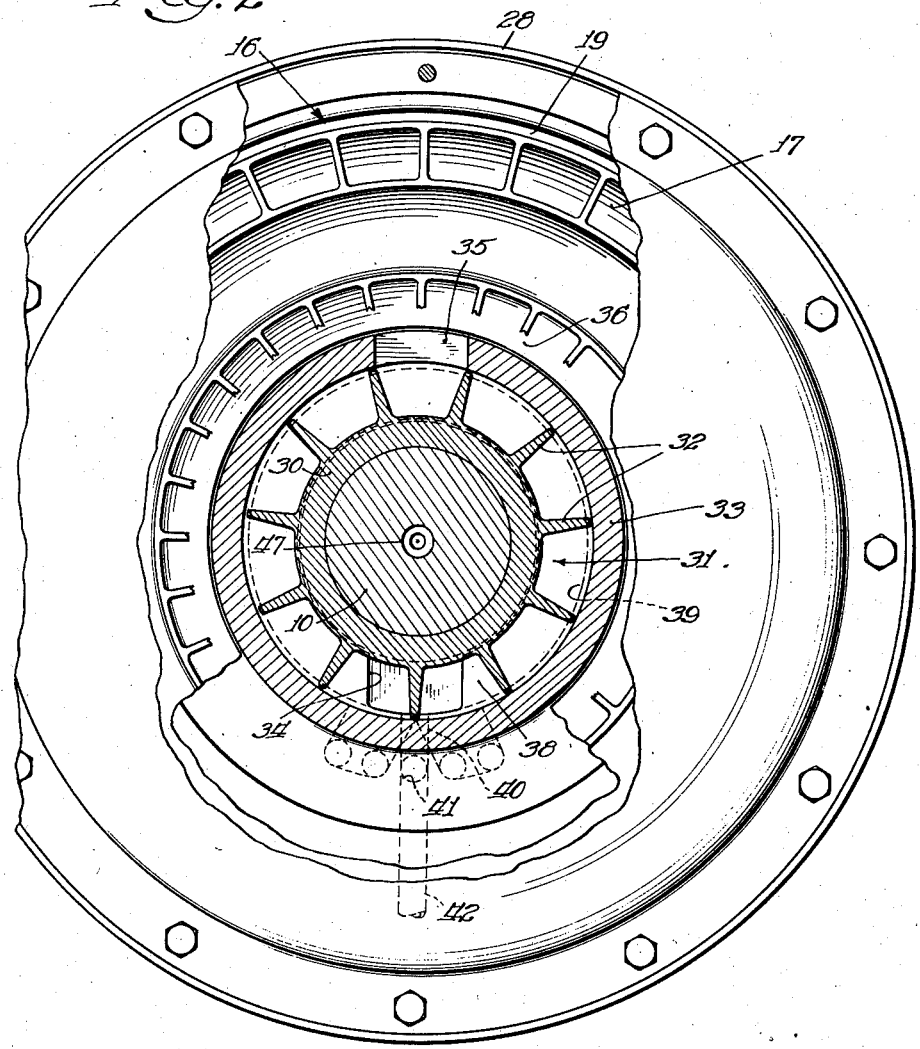

These and other features and objects of the invention will become apparent from the following description when taken together with the accompanying drawings in which:

Figure 1 is a side elevation in section of the novel hydrodynamic transmitting device; and Figure 2 is a rear elevation partly in section of the hydrodynamic device showing the arrangement of vanes for the pump.

One of the most desirable characteristics of a hydrodynamic coupling is its ability to absorb shock. This characteristic makes such a coupling particularly desirable for use in industrial equipment such as cranes, derricks, hoists, power operated shovels, tractors, etc., where heavy loads are picked up quickly and dropped just as quickly. The internal combustion engines used with such devices do not employ starters of the type generally used in automobiles and trucks and hence the ring gear and flywheel usually found on the crank shaft may be modified considerably.

In accordance with our invention a hydrodynamic drive for an industrial engine can be simplified considerably by reversing the positions of the impeller and runner so that the impeller is nearest the engine and driving shaft, and the runner is nearest the driven shaft and is provided with a shroud which surrounds the impeller. A further simplification is effected in accordance with our invention by using the engine oil as the power transmitting medium in the coupling and placing the pump between the main bearing and the fluid impeller. Such a construction eliminates the oil seal usually found at the driven shaft and places all oil seals at or near the main bearing where such a seal is commonly used. The driven end of the coupling is therefore perfectly clean and the runner of the coupling may be welded directly to the driven shaft.

Referring now to the drawings for a detailed description of the invention 10 is the drive shaft of an internal combustion engine, such as a gasoline or Diesel engine, and 11 is a driven shaft which is connected by suitable means (not shown) to the load. Drive shaft 10 is rotatably supported by bearing 12 in a frame 13 which may be the crank case of the internal combustion engine, and driven shaft 11 is similarly supported by bearing 14 in a housing 15. Said shafts are coupled together by means of a hydrodynamic coupling designated generally by reference character 16.

The coupling connecting the shafts is comprised of a driving element or impeller 17 and a driven element or runner 18 having outer shells 19 and 20 respectively defining a toroidal path for the fluid. Driven element 18 may be formed as a casting which is secured by means of rivets 21 to a stamping 22. Mounted on driven shaft 11 is a flanged hub 23 which may be welded as at 24 and 25 to the driven shaft. Stamping 22 is in turn welded as at 26 and 27 to hub 23 thereby forming a strong and fluid-tight connection with driven shaft 11.

To stamping 22 is bolted a shroud 28 which extends forwardly toward the engine and which has a cylindrical seal container 29 formed at the inner end thereof.

Driving element 17 has a collar 30 formed integrally therewith by which said impeller is fixed upon driving shaft 10. Thus rotation of shaft 10 causes a rotation of impeller 17.

Between bearing 12 and impeller 17 is located a pump 31 which serves to maintain a sufficient amount of fluid within coupling 16 to maintain the drive through the coupling. Said pump 31 is comprised of a series of radial vanes 32 which cooperate with a fixed collar 33 having inlet and outlet openings 34 and 35 respectively, for the passage of the fluid. Opening 35 is aligned with an annular opening 36 formed in impeller 17 by conical flange 37 in outer shell 19.

Opening 34 is formed by an inwardly depending flange 38 in collar 33 which serves as a partition between pump vanes 32 and inlet chamber 39. Said chamber 39 communicates by means of passageways 40 and 41 with a tube 42 which in turn passes into the crank case 13 wherein is located the usual oil reservoir 44.

Driven shaft 11 is piloted at 45 in driving shaft 10 by means of bearings 46. Excess oil in coupling 16 forces its way between stamping 22 and the rearward end of collar 30 through bearings 46 into a centrally located outlet passage 47 in drive shaft 10. At the right hand end (Figure 1) of passage way 47 is a spring loaded ball valve 48 in which is a smaller aperture 49. Valve 48 is adjustable so that the amount of pressure placed upon the oil in passage 47 may be changed as desired.

When in operation, drive shaft 10 rotates impeller member 17 which at the same time causes pump 31 to begin to function. As the rotation of the pump 31 and impeller 17 continues, fluid is drawn up through tube 42 from reservoir 44 into passageways 41 and 40 whence the fluid enters chamber 39. As vanes 32 sweep past opening 34 a quantity of oil is scooped up and rotated with the vanes until it reaches opening 35 in collar 33. The centrifugal force imparted by the rotating vanes 32 causes the fluid to pass through openings 35 into annular opening 36 in outer shell 19 and thence into the impeller proper. Here the oil is forced to flow in a series of streams against the vanes in runner 18 and thereby impart rotary motion thereto. Since runner 18 is rigidly secured to driven shaft 11 the latter will be rotated with runner 18. Any excess oil that may be pumped into coupling 16 will find its way back into the reservoir through passageway 47 and the opening 49 in valve 48.

The simple and compact nature of the construction just described is believed to be apparent and to require no further explanation. Because of this simplicity of construction the coupling is less apt to get out of order or to require servicing. The welded construction of the runner and its mounting on driven shaft 11 serves to prevent the entry of dirt and other foreign particles into the coupling. The seal at the forward end of shroud 28 is so located that very little dirt is likely to be present when the coupling is in operation. Forming the impeller and pump as a single casting results in a much cheaper and more rugged construction.

The foregoing description is merely illustrative of a preferred embodiment of the invention and it is understood that the scope of the invention is not to be limited thereto but is to be determined by the appended claims.

What is claimed is:

1. A power transmitting device of the hydrodynamic type comprising a drive shaft, a support therefor, a driven shaft, a vaned member connected to the driven shaft, and a member connected to the driving shaft, said last-mentioned member having a semi-toroidal outer shell, a set of driving vanes within said shell, a set of pump vanes outside said shell, the shell having an annular opening, a fixed pump element interposed between the opening and the pump vanes, said fixed element having a passageway connecting the pump vanes with the opening, means on the support surrounding the shaft and having a passage for the admission of fluid to the pump vanes, said shaft having an outlet passageway communicating with the vaned members.

2. A power transmitting device of the hydrodynamic type as described in claim 1, and a conical flange on the outer shell defining the annular opening and serving to direct the fluid into the device.

3. A power transmitting device of the hydrodynamic type comprising a drive shaft, a support therefor, a driven shaft, a vaned member connected to the driven shaft, and a member connected to the driving shaft, said last-mentioned member having a semi-toroidal outer shell, a shroud enclosing both of said members, a set of driving vanes within said shell, a set of pump vanes outside said shell, the shell having an annular opening, a fixed pump element interposed between the opening and the pump vanes, said fixed element having a passageway connecting the pump vanes with the opening, and means on the support surrounding the shaft and having a passage for the admission of fluid to the pump vanes, said shaft having an outlet passageway communicating with the vaned members, and said pump vanes and pump element being located within the shroud.

4. A power transmitting device as described in claim 3, said pump vanes, fixed pump element and annular opening being spaced radially from one another whereby to lessen the axial dimension of the power transmitting device.

5. A power transmitting device of the hydrodynamic type comprising a drive shaft, a support therefor, a driven shaft, a vaned member connected to the driven shaft, and a member connected to the driving shaft, said last-mentioned member having a semi-toroidal outer shell, a set of driving vanes within said shell, a set of pump vanes outside said shell, the shell having a radially inwardly flaring flange defining an opening into the shell, a fixed pump element interposed between the opening and the pump vanes, said fixed element having a passageway connecting the pump vanes with the opening, and means on the support surrounding the shaft and having a passage for the admission of fluid to the pump vanes, said shaft having an outlet passageway communicating with the vaned members.

RAYMOND A. CARLSON.
BENJAMIN A. SWENNES.